Aug. 25, 1959 H. H. PATTERSON ET AL 2,901,613

DETECTOR FOR MODULATED AND UNMODULATED SIGNALS

Filed Aug. 5, 1957

INVENTORS:
Hubert H. Patterson
George H. Webber
BY
Roland A. Anderson
Attorney

United States Patent Office 2,901,613

Patented Aug. 25, 1959

2,901,613

DETECTOR FOR MODULATED AND UNMODULATED SIGNALS

Hubert H. Patterson, Albuquerque, N. Mex., and George H. Webber, Syracuse, N.Y., assignors, by mesne assignments, to the United States of America as represented by the United States Atomic Energy Commission

Application August 5, 1957, Serial No. 676,452

1 Claim. (Cl. 250—31)

This invention relates to a detector for indicating the presence of a modulated or unmodulated radio frequency carrier, and more particularly to a detector having an arrangement of crystal diodes to modulate or demodulate a modulated signal.

A crystal detector has been found better than any vacuum tube when used at higher radio frequencies from a noise point of view. This is especially true at radio frequencies (RF) of from 200 to 10,000 megacycles per second. Conventional receivers in this frequency range do not have provision for modulating a continuous wave (C.W.) signal so as to produce an audible output if the C.W. signal is present and no audible signal output if the C.W. signal is not present. The detector of this invention has the particular advantage of introducing modulation onto a C.W. signal, thereby enabling the production of an audible signal through a speaker or earphones. This audible signal is not present when no C.W. signal is present. This invention has a further advantage of demodulating a modulated RF signal and producing an audible sound through a speaker or earphones.

In accordance with the features of the present invention, the complete detector comprises three separate components: a broadband antenna, a crystal detector mount, and a high-gain amplifier with provision for either a speaker or earphones. The crystal detector mount with the means for modulating an unmodulated RF carrier signal and demodulating a modulated RF carrier signal is the important feature of the invention. This crystal detector mount contains two crystals, one employed as a detector crystal diode and the other as a modulating crystal diode. A coupling probe is also contained in the mount to supply local oscillator power to the detecting probe. A pair of resistors are used to complete the D.C. path of each crystal diode, and a coupling capacitor serves to transmit the RF energy while keeping the low frequencies tone on the modulating crystal from getting directly through to the detecting crystal.

The invention also resides in features of construction, combination and arrangement herein disclosed and claimed.

For a more detailed understanding of the invention and for illustration of various forms thereof, reference is made to the accompanying drawings, in which.

Figure 1:
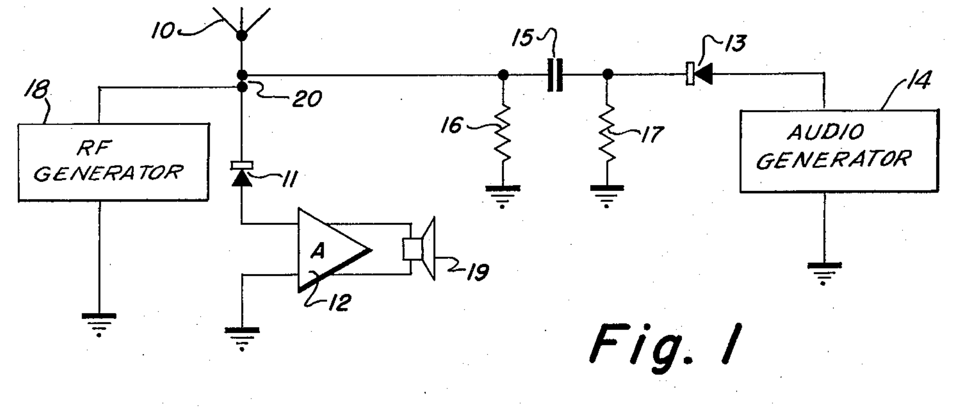
Fig. 1 is a circuit diagram showing the complete detector system.

Referring to Fig. 1, antenna 10, which is capable of sensing RF energy over a very broad band of frequencies, is connected to detecting crystal diode 11. This crystal diode may be thought of as a low-level square-law detector in which the D.-C., or rectified output is proportional to the square of the amplitude of the input signal. This crystal detector is similar to the old type radio receiver crystal detector. Such a detector was typically made by soldering or clamping a small piece of crystal, like galena, in a small cup or receptacle. The rectifying contact was made of flexible wire, called a cat whisker, and maintained in a manner to touch the crystal lightly. Detecting crystal 11 is similar except the crystal is silicon and the cat whisker is permanently attached to the crystal. This crystal diode, like any diode, has a small forward resistance and a large back resistance. Wideband coverage of the crystal detector can be attributed largely to the inherent insensitivity of crystals to changes of frequency; it is limited only by the frequency sensitivity of the R–F components. The output of crystal diode 11 is connected to the input of audio amplifier 12.

Modulating crystal diode 13 connected between audio tone oscillator 14 and coupling capacitor 15 is similar in type and characteristics to detecting crystal diode 11. The coupling capacitor is connected between modulating crystal diode 13 and antenna 10. This coupling capacitor 15 serves to transmit the RF energy while keeping the low-frequency tone on the modulating crystal from getting directly through to the detecting crystal. In other words, capacitor 15 provides low-frequency isolation between the modulating signal source and amplifier 12. Resistors 16 and 17 connected between ground and opposite sides of capacitor 15 are used to complete the D.-C. path of crystal diodes 11 and 13 respectively, thus providing correct bias for the crystal diodes. It has been found that by injecting some RF energy from source 18 directly to detecting crystal diode 11 at the same frequency as the incoming signal, the sensitivity of crystal diode 11 increases several times. This increase in sensitivity approaches that obtainable in a superheterodyne system for signals that are on the frequency of the local oscillator.

In operation, if a modulated RF signal is received at antenna 10, it is transmitted to detecting crystal diode 11, where it is demodulated. This demodulated audio frequency signal is transmitted to audio amplifier 12 where it is amplified and heard by means of speaker 19.

An unmodulated C.W. signal received at antenna 10 would normally produce no audible output. However, by means of modulating crystal diode 13, an "induced" modulation is superimposed on any signal coming in the antenna path. The signal coming in this path is split between the crystal diodes 11 and 13 so that part of the signal goes to detecting crystal diode 11 and part to modulating crystal diode 13. Modulating crystal diode 13 does not normally present a perfect match to the signal. By changing the bias by means of a modulating voltage, varying amounts of power are reflected back to the junction point 20. At junction point 20, this modulated reflected signal is added to the portion of the original C.W. signal going to the detecting crystal diode 11 directly so that the signal actually reaching the detecting crystal diode 11 contains modulation at a frequency equal to the modulating voltage. If there is no C.W. signal present, there will be nothing for the modulating crystal diode 13 to act upon and therefore no audio tone will be heard at the amplifier output.

Figure 2:
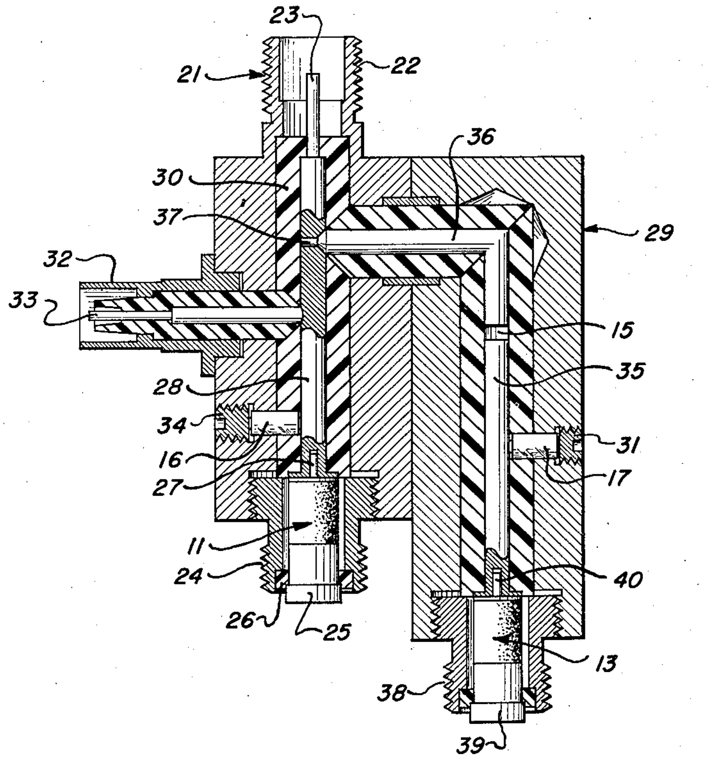
Fig. 2 is a cross sectional view of the crystal detector mount.

A preferred physical construction in the arrangement of mounting the crystal diodes and their associated components is shown in Fig. 2. The antenna is connected at connector 21 with the threaded portion 22 as one terminal and a center conductor 23 as the other terminal. Detecting crystal diode 11 is inserted in threaded connector 24, with base 25 of crystal diode 11 at its open end. Base 25 of crystal diode 11 is also its anode and is insulated from connector 24 by plastic ring 26 preferably constructed of material having good insulating characteristics at high frequency, such as tetrafluoroethylene sold under the trademark "Teflon." Cathode 27 of detecting crystal diode 11 is inserted in conducting rod 28. This conducting rod 28 is insulated from outer casing 29 by plastic sleeve 30. A connection is made between terminal 23 of connector 21 and cathode 27 of detecting crystal diode 11 by conducting rod 28. The RF power is coupled to detecting crystal diode 11 by a connection to connector 32 whose center terminal 33 is connected directly to conducting rod 28. The outer shell of connector 32 is the other terminal of RF energy source 18 (Fig. 1). Casing 29 may be thought of as the ground terminal of the schematic of Fig. 1.

Resistor 16 is inserted in casing 29 with one of the conducting ends of the resistor making contact with conducting rod 28. The other conducting end of the resistor makes contact with threaded plug 34 which in turn makes contact with casing 29. Resistor 17 is similarly inserted in casing 29 and makes contact with conducting rod 35 and threaded plug 31. Conducting rod 35 cannot be considered to be the same as conducting rod 28, since there is a break between conducting rod 35 and conducting rod 36. This break in the two conducting rods 35 and 36 constitutes capacitor 15 of Fig. 1. This spacing between conducting rods 35 and 36 with air dielectric, creates a capacitance calculated to be acceptable for operation of the circuit. Conducting rod 36 is connected to conducting rod 28 by the insertion of conducting rod 36 into conducting rod 28 at the connecting point 37. Conducting rods 28, 36 and 37 are the same in diameter and material. They are also maintained in and insulated by plastic.

Modulating crystal diode 13 is inserted in connector 38 in the same manner as the detecting crystal diode 11, with anode 39 of crystal diode 13 at the open end of connector 38 and its cathode 40 inserted in conducting rod 35.

What has been described is a unique detector for detecting the presence of modulated and unmodulated RF energy, both as to the circuit and to its physical construction.

It shall be understood the invention is not specifically limited to the particular embodiments shown, but that changes and modifications may be made within the scope of the appended claim.

What is claimed is:

A crystal detector unit comprising an outer conductive casing, a first cylindrical RF conducting rod supported therein and extending from an antenna coaxial connector at one outer casing surface to the cathode of a first crystal diode mounted adjacent an opposing casing outer surface, said first conducting rod being internally interrupted by an air gap sufficient to create a predetermined value of capacitance in said conductor, a second cylindrical RF conducting rod supported within said casing and joined at one of its ends to the first conducting rod at a point intermediate the air gap and the antenna connection thereof, its other end extending to the cathode of a second crystal diode mounted adjacent the said opposite outer casing surface, a first resistor connected between the outer casing and the first conductor intermediate the diode connection thereof and the air gap therein, a second resistor connected between the outer casing and the second conductor at a point intermediate the diode connection thereof and its junction with the first conducting rod, and a continuous plastic insulation separating all parts of the first and the second conducting rods from the outer casing to effect a predetermined unit impedance.

References Cited in the file of this patent

UNITED STATES PATENTS

| | | |
|---|---|---|
| 1,546,639 | Farrand | July 21, 1925 |
| 1,746,796 | Round | Feb. 11, 1930 |
| 1,868,614 | Overacker | July 26, 1932 |
| 2,038,236 | Posthumus | Apr. 21, 1936 |
| 2,131,109 | Lowell | Sept. 27, 1938 |
| 2,514,859 | Griffin | July 11, 1950 |